Feb. 27, 1940.     J. F. COX     2,192,069
CALIBRATING DEVICE FOR VALVES
Original Filed Feb. 24, 1938
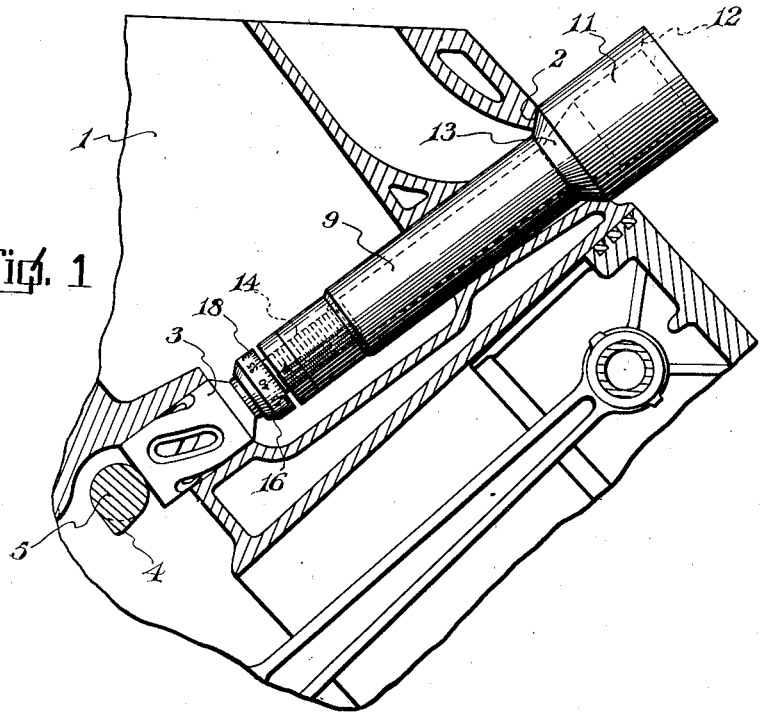
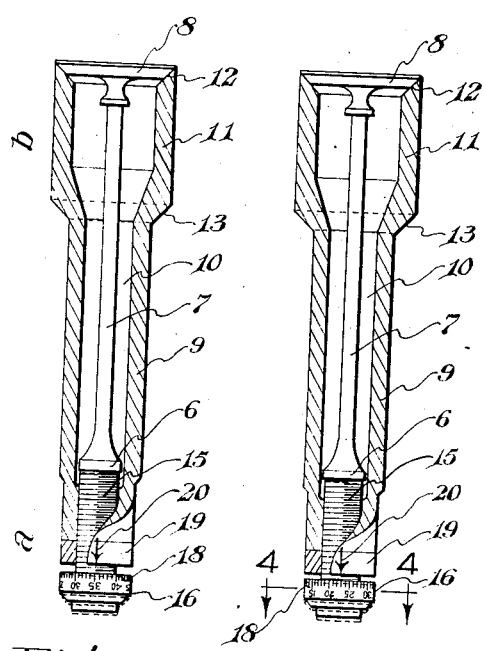
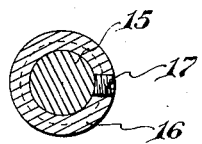
Joseph F. Cox
INVENTOR
ATTORNEY Patented Feb. 27, 1940

2,192,069

UNITED STATES PATENT OFFICE 2,192,069

CALIBRATING DEVICE FOR VALVES

Joseph F. Cox, Tulsa, Okla., assignor of one-half to John E. French, Tulsa, Okla.

Application February 24, 1938, Serial No. 192,374
Renewed January 23, 1940

2 Claims. (Cl. 33—181)

The invention relates to gauging and calibrating devices adapted to be used by mechanics during a valve and valve seat regrinding operation whereby the proper clearance may be maintained between the valve stem and tappet, and the proper amount of grinding indicated on the valve stem to maintain the clearance after the valve and valve sea grinding operation.

A further object is to provide the gauge with an exterior bevelled shoulder, adapted to seat in the valve seat and the lower end of the gauge with an extensible plunger adapted to be threaded outwardly into engagement with the tappet, and provided with indicia for indicating, in connection with the length of the gauge, the total distance from the valve seat to the tappet, including the normal clearance.

A further object is to provide the upper end of the gauge with a chambered extension having a valve seat therein above the engine block valve seat and equidistant therefrom to the length of the plunger against which the valve stem engages when placed through the gauge into engagement with the plunger, so the operator can read on the graduations the amount of grinding necessary on the valve stem to take care of the valve and valve seat grinding to maintain the original valve clearance at the tappet.

A further object is to provide the threaded plunger with a lock nut cooperating with the body of the gauge for positively locking the plunger in adjusted position.

A further object is to provide a valve gauging and calibrating tool by means of which accurate distances may be obtained between a ground valve seat and valve and a tappet including the normal clearance at the tappet and the valve stem ground accurately to these dimensions and with the proper normal clearance without the necessity of further inserting the valve and stem in the engine block.

A further object is to provide a valve and valve stem gauging and calibrating device whereby single measurements may be taken at the individual positions of the engine and recorded, and the valve stems accurately ground without further reference to the engine, so all of the valves will have a uniform normal clearance in relation to the tappets.

With the above and other objects in view the invention resides in the combination and arrangement of parts as hereinafter set forth, shown in the drawing, described and claimed, it being understood that changes in the precise embodiment of the invention may be made without departing from the spirit of the invention.

In the drawing:

Figure 1 is a detail sectional view through a portion of an engine, showing the valve gauging and calibrating tool in the valve seat thereof for accurately measuring the distance between the valve seat and tappet, including the normal valve stem clearance.

Figure 2 is a vertical transverse sectional view through the gauge with the plunger extended and in engagement with the valve stem for indicating the amount of grinding necessary on the valve stem to re-establish proper length of stem and clearance in relation to the tappet.

Figure 3 is a view similar to Figure 2 showing the gauging operation after the stem grinding operation and indicating the proper clearance.

Figure 4 is a horizontal sectional view taken on line 4—4 of Figure 3.

Referring to the drawing, the numeral 1 designates a conventional form of internal combustion engine and 2 a valve seat therein. Axially disposed in relation to the valve seat 2 is a slidable tappet 3, which is forced outwardly by the cam 4 on the cam shaft 5 so that the tappet will engage the foot 6 of the valve stem 7 for unseating the valve 8 carried by the stem. This structure is conventional, and in the drawing only one valve seat is disclosed for purposes of illustration, however it is understood the gauging and calibrating device is adapted to be successively used on other valves of the engine so the normal factory clearance between the valve stem foot 6 and the tappet 3 may be restored.

It is obvious that when the valve 8 and seat 2 are reground, the clearance of the foot 6 and the tappet 3 will be varied, consequently to get the proper operation of the valves it will be necessary to grind the foot 6 of the stems to restore the normal factory clearance, in relation to the tappets. To accomplish the above result the gauging tool is formed with fixed dimensions and with means for indicating the necessary amount of grinding from the foot 6.

The gauge comprises a body 9 having a chamber 10 extending therethrough for the reception of the valve and valve stem during a gauging operation. The body 9 is provided with a chambered head portion 11 having a valve seat 12 in the upper end thereof, and with an outer bevelled shoulder 13 adapted to engage in the valve seat 2 of the engine during a measuring operation. Threaded at 14 into the lower end of the body 9 is a plunger 15 having an adjustable scaled member 16 on the lower end thereof, and held by means of the set screw 17. Plunger 15 is adapted to be extended for obtaining an accurate measurement of the distance between the valve seat 2 and the tappet 3. This operation establishes the proper length of the valve and valve stem including the normal factory clearance, which may be deducted from the measurement after the device is removed from the seat 2, for the valve stem measuring operation. The distance between the lower end of the plunger 15 and the upper end thereof, as indicated at a, Figure 2, remains constant, and the distance between the lower edge of the bevelled surface 13 and the lower edge of the seat 12 of the valve 8, when in the device, is the same as the distance a, as indicated at b, Figure 2. It will be seen that after the initial adjusting of the plunger outwardly and the valve and valve stem are placed in the device as shown in Figure 2, the operator can take a reading from the scale 18 and then adjust the plunger outwardly until the valve 8 seats at 12 and take a further reading on the scale 18, and ascertain how much grinding is necessary on the foot 6 to restore the normal factory clearance between the valve stem and tappet 3 when the valve is again replaced in the engine. It is understood that the operator may take all of these measurements of all of the valves in the engine and make a record thereof so he will not have to return to the engine from time to time to try each valve and prolong the grinding operation. It will also be seen that the operator can accurately grind all the valves and be sure there is a proper clearance of each valve when again placed in the engine. During the grinding operation, the grinder can accurately test the amount of grinding by placing the valve in the device as shown at Figure 3. The operator will immediately know the stem is ground to proper dimension when its foot 6 engages the plunger 15 and the valve 8 is seated in the valve seat 12 as shown in Figure 3. Plunger 15 is preferably provided with a lock nut 19, which cooperates with the body 9 for positively holding the plunger in adjusted position. By providing the set screw 17, the sleeve 16 may be adjusted upwardly or downwardly on the plunger for taking up wear on the parts, incident to constant use.

Scale 18 cooperates with an indicating point 20 carried by the body 9 and lock nut 19.

The following is an illustration of the use and operation of the device in connection with the regrinding of valves and valve seat on an automobile now in use, wherein there is a clearance of .017 between the valve stem and tappet.

Assuming the valve seat 2 and valve have been ground, and the gauging device inserted in the engine block as shown in Figure 1, and the cam shaft 5 rotated so as to place the cam 4 in the position shown in Figure 1, and at which time the tappet 3 is in its extreme lower position. The plunger 15 has been previously adjusted outwardly until its outer end contacts the surface of the tappet. Then the jam nut 19 is screwed up against the body 9 for locking the plunger in adjusted position. In Figure 1 is shown the vernier set at .040, therefore the total dimension is the length of the tool plus the .040; the operator then records this measurement so that valve stem can be calculated for grinding purposes from this information. In Figure 2 is shown a valve and stem, the stem of which is to be ground within the tool body with the bevelled valve 8 seated on the valve seat 12 at the upper end of the tool, and the retractible plunger screwed upwardly to contact the foot 6 of the valve stem. If the valve and the seat in the block were new as they come from the factory, the two readings would show a difference of .017, or the factory clearance. In Figure 2, it shows a difference of only .005 denoting that the valve and its seat has been ground all told .012. The vernier reading in Figure 2 is .035 of an inch. This will indicate to the grinder that there is only .005 of an inch clearance if the valve were put back in the engine block without being ground off at the foot 6, and would indicate that .012 inch has to be ground off to get the standard clearance of .017 of an inch. After grinding off the .012 of an inch and the operator wishes to check his work, he again inserts the valve in the tool and screws the retractible plunger 15 inwardly until he feels it touch the valve stem foot 6, and if the reading is then .023 of an inch as shown in Figure 3, he will know the foot 6 has been ground correctly for a .017 of an inch taken from .040 of an inch, which would leave the .023 of an inch as indicated in Figure 3. When the particular valve is again put in the particular seat from which it was removed, there is a perfect .017 of an inch factory clearance.

It will be obvious in hand grinding that the amount of cutting away will vary, therefore the valves must be put in the places they were measured to fit. By keeping a record of the block measurements the particular valves may be accurately ground and replaced in their original positions in the engine block.

From the above it will be seen that a valve gauging and calibrating device is provided which is simple in construction, and by means of which the amount of cut necessary to be removed from a valve stem foot accurately ascertained so that when the valve and stem is again replaced, it will be of the proper length in relation to the tappet and with the predetermined clearance. It is to be understood that the above example of clearance is for purposes of illustration only.

The invention having been set forth what is claimed as new and useful is:

1. A gauge for valves having stems, said gauge comprising a body member having a chamber extending entirely therethrough for the reception of a valve and valve stem, a valve seat engaging shoulder on the outside of said body and spaced from the ends thereof and forming an enlarged end at one end of the body member, the outer end of said enlarged end having a valve seat therein for the reception of the valve and an extensible graduated valve stem engaging member carried by the other end of said body member and adapted to engage a tappet for indicating the proper clearance between a valve stem and tappet.

2. A device as set forth in claim 1 wherein the distance between the shoulder on the outside of the body member and the valve seat is equal to the length of the extensible member.

JOSEPH F. COX.